United States Patent [19]
Abert et al.

[11] Patent Number: 5,608,882
[45] Date of Patent: Mar. 4, 1997

[54] ARRANGEMENT FOR TRANSMITTING DATA OVER A BUS

[75] Inventors: Michael Abert, Au; Siegfried Block, Kandel; Johannes Bozenhardt; Franz Leigsnering, both of Ettlingen; Werner Pfatteicher, Pfinztal; Franz-Clemens Schewe, Karlsruhe, all of Germany

[73] Assignee: Siemens Aktiengesellschaft, Munch, Germany

[21] Appl. No.: 436,403

[22] PCT Filed: Nov. 18, 1993

[86] PCT No.: PCT/DE93/01098

§ 371 Date: May 22, 1995

§ 102(e) Date: May 22, 1995

[87] PCT Pub. No.: WO94/12936

PCT Pub. Date: Jun. 9, 1994

[30] Foreign Application Priority Data

Nov. 24, 1992 [DE] Germany .......................... 42 39 461.9

[51] Int. Cl.$^6$ ........................................... G06F 13/00
[52] U.S. Cl. ........................... 395/307; 395/282; 395/886
[58] Field of Search .................... 395/307, 306, 395/308, 282, 886

[56] References Cited

U.S. PATENT DOCUMENTS

| | | | |
|---|---|---|---|
| 4,716,527 | 12/1987 | Graciotti | 395/307 X |
| 4,860,198 | 8/1989 | Takenaka | 395/307 |
| 5,038,317 | 8/1991 | Callan et al. | 395/282 |
| 5,045,998 | 9/1991 | Begun et al. | 395/307 |
| 5,113,369 | 5/1992 | Kinoshita | 395/325 |
| 5,335,340 | 8/1994 | Strong | 395/500 |
| 5,423,009 | 6/1995 | Zhu | 395/307 |
| 5,428,763 | 6/1995 | Lawler | 395/500 |

FOREIGN PATENT DOCUMENTS

| | | |
|---|---|---|
| 0466970 | 1/1992 | European Pat. Off. . |
| 3133407 | 4/1983 | Germany . |

OTHER PUBLICATIONS

Electronic Design, vol. 33, No. 12, Jan. 24, Hasbrouck Heights, NJ, pp. 219–225, C. K. Zoch et al.: 68020 *Dynamically Adjusts its Data Transfers to Match Peripheral Ports.*

Primary Examiner—Glenn A. Auve
Attorney, Agent, or Firm—Kenyon & Kenyon

[57] ABSTRACT

An arrangement for transmitting data over a bus (2, 6, 7) has a central unit (1, 4, 5) which initiates data transmission and one or several peripheral units (3, 8, 9) linked to each other by the bus. In at least one of the components, besides first control lines and data lines for transmitting a data word having a first data width, further control lines and further data lines for transmitting a data word having a second data width are also provided. These are designed in such a way that components with different data bus widths can communicate with each other by transmission of data words having the smallest existent data width. In automation equipment, the invention allows any combination of components of different classes of capacity.

8 Claims, 2 Drawing Sheets

FIG. 2

| ZE | | | | | | PE | | | | | | | | | | | | | | |
|---|---|---|---|---|---|---|---|---|---|---|---|---|---|---|---|---|---|---|---|---|
| | | | | | | 32 Bit | | | | | 16 Bit | | | | | 8 Bit | | | | |
| ZW | A1 | A0 | WS | DWS | DA | R8 | R16 | R32 | ZA | DA | R8 | R16 | R32 | ZA | DA | R8 | R16 | R32 | ZA |
| DW | L | L | L | L | D0..D31 | H | H | L | DW | | | | | | | | | | |
| * | L | L | L | L | | | | | | | | | | | | | | | |
| * | L | H | L | L | | | | | | | | | | | | | | | |
| * | H | L | L | L | | | | | | | | | | | | | | | |
| W | L | L | L | H | | | | | D0..D15 | H | L | H | W | | | | | |
| * | L | H | L | H | | | | | | | | | | | | | | | |
| W | L | L | L | H | | | | | D0..D15 | H | L | H | W | | | | | |
| * | L | H | L | H | | | | | | | | | | | | | | | |
| B | L | L | H | H | | | | | D0..D7 | L | H | H | B | D0..D7 | L | – | – | B |
| B | L | H | H | H | | | | | D0..D7 | L | H | H | B | D0..D7 | L | – | – | B |
| B | H | L | H | H | | | | | D0..D7 | L | H | H | B | D0..D7 | L | – | – | B |
| B | H | H | H | H | | | | | D0..D7 | L | H | H | B | D0..D7 | L | – | – | B |

ARRANGEMENT FOR TRANSMITTING DATA OVER A BUS

BACKGROUND OF THE INVENTION

The present invention concerns an arrangement for transmitting data over a bus having a central unit which initiates data transmission and one or several peripheral units linked to each other by the bus.

An arrangement of this sort is known from the DE-PS 31 33 407. There, a processor as a central unit is connected to a memory as a peripheral unit by a bus. The bus contains data lines whose number corresponds to the word width, address lines for addressing the individual memory cells and control lines for controlling the data transmission. Data transmission can take place selectably as 8-bit-wide byte accesses or 16-bit-wide word accesses. To select the access mode, besides READ and WRITE signals, a BYTE signal is also provided which is evaluated in a control signal decoder. The processor executes a fixed microprogram which is tailored to the special hardware configuration. A change in the number of data lines thus leads necessarily to a change in the microprogram. For example, the memory cannot be easily replaced by a memory of another data width.

In electronic, modularly designed devices in which the components central unit, peripheral unit and bus are interchangeable, there exist both cost-effective devices with a small data bus width as well as devices of the upper class of capacity which are characterized by a data bus of large width.

The underlying object of the invention is to create an arrangement in which the components of different classes of capacity can be combined together in any way.

SUMMARY OF THE INVENTION

The present invention achieves this objective by providing an arrangement for transmitting data over a bus having a central until which initiates data transmission and one or more peripheral units linked to each other by the bus, the units and the bus having first control lines for a first transmission request signal of the central unit and for a first transmission acknowledgement signal of a peripheral unit for parallel transmission of a data word of a first data width and at least one unit and/or the bus having second control lines for parallel transmission of a data word of a second data width, which carry a second transmission request signal and a second transmission acknowledgement signal, such that the second transmission request signal in the peripheral unit and the second transmission acknowledgement signal in the central unit assume an active state only if all devices involved in the transmission have second control lines.

In the arrangement the second data width can be a multiple of the first. In fact, there can be three different data widths achievable, 8 bits, 16 bits and 32 bits. The units can be plug-in modules while the bus can constitute a rear panel wiring of a card rack. The arrangement can include a further control line to indicate bus usage which is activated during transmission of the data word of the second data width if not all devices involved in the transmission have second control lines such that the data word of a second data width is transmitted through transmission of a number corresponding to the multiple of successive data words of the first data width.

The invention has the advantage that components of different classes of capacity can be combined together in a modular device. To connect a central unit or peripheral units to the bus, which can be designed as rear-panel wiring in a card rack, no particular card slots suitable only for modules of specific classes of capacity are required. The modules of different classes of capacity can be arranged according to the invention in any given slot. For example, the operation of modules having a 32-bit data bus width is possible in a card rack having an 8-bit data bus width in the rear-panel wiring. The invention allows in this manner a gradual increase in capacity from 8-bit to 32-bit data bus width by exchanging individual components as part of a quasi-flowing transition without having to exchange the entire device in one step. The arrangement according to the invention allows the use of future, powerful components in today's card rack, while at the same time components in common use today can be used in a future card rack. No additional circuit-related cost arises for components of the lower class of capacity due to this freedom.

BRIEF DESCRIPTION OF THE DRAWINGS

The present invention will be explained with reference to the drawings.

FIG. 2 shows the signal coding associated with the present invention in tabular form.

DETAILED DESCRIPTION

Figure 1:
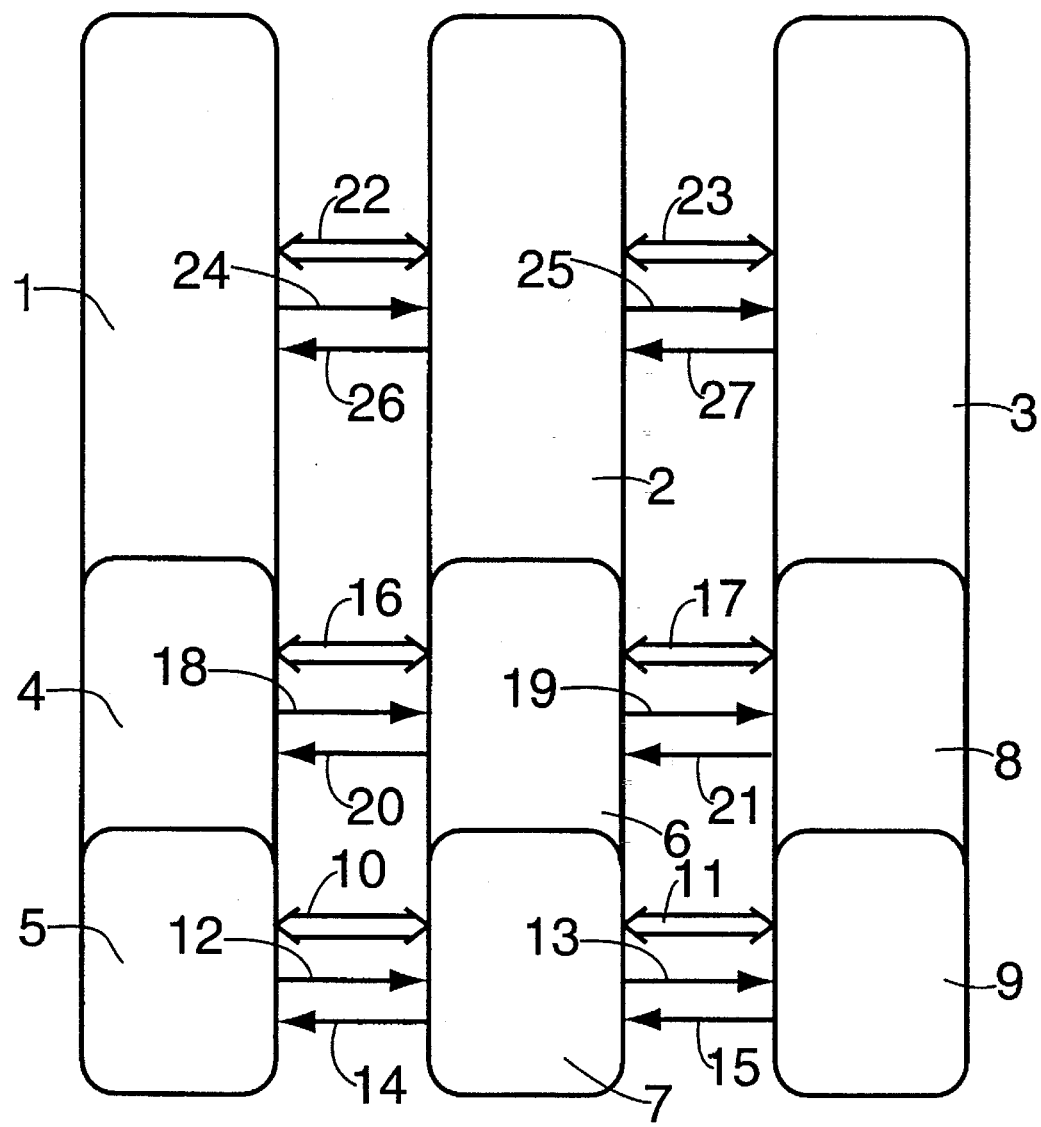
FIG. 1 shows an exemplary embodiment of the present invention.

According to FIG. 1, a modular device has a central unit 1, a bus 2 and a peripheral unit 3, each of which has a 32-bit-wide data bus. The range of capacity of the central unit 1 includes that of a central unit 4 having a 16-bit-wide data bus, which in turns encompasses that of a central unit 5 having an 8-bit-wide data bus. The same applies analogously to the bus 2 and a 16-bit-wide bus 6 as well as an 8-bit-wide bus 7 and to the peripheral unit 3, a peripheral unit 8 having a 16-bit-wide data bus connection and a peripheral unit 9 having an 8-bit data bus. All of these components which are involved in the exchange of data can be combined in any manner. In the simplest case, the central unit 5, the bus 7 and the peripheral unit 9 are used, each of which has available an 8-bit-wide data bus connection. In this minimum configuration, connecting elements 10 and 11 for the transmission of data signals D0 . . . D7, connecting elements 12 and 13 for the transmission of control signals RD (READ), WR (WRITE) and BL (BUS LOCK) as well as connecting elements 14 and 15 for the transmission of a control signal R8 (READY 8 BIT) as an acknowledgement signal for 8-bit data transmission are present. There is no need to examine in greater detail the sequence in time of data transmission since it is common knowledge to those skilled in the art.

In a modular device of the middle class of capacity having a 16-bit-wide data bus connection in each of the central unit 4, the bus 6 and the peripheral unit 8, connecting elements 16 and 17 for the transmission of data signals D8 . . . D15, connecting elements 18 and 19 for the transmission of a control signal WS (WORD SELECT) that designates 16-bit word accesses as well as connecting elements 20 and 21 for the transmission of a control signal R16 (READY 16 BIT), which is used as an acknowledgement signal for 16-bit data transmission, are added. For the maximum configuration having a 32-bit data bus in each of the central unit 1, the bus 2 and the peripheral unit 3, these are extended to include connecting elements 22 and 23 for the transmission of data signals D16 . . . D31, connecting elements 24 and 25 for the transmission of a control signal DWS (DOUBLE WORD SELECT) with which a 32-bit double word access can be selected and connecting elements 26 and 27 for the transmission of a control signal R32 (READY 32 BIT) as an acknowledgement signal for 32-bit data transmission. The address signals A0 . . . A17 required for addressing are omitted in FIG. 1 for the sake of clarity. In the maximum configuration, read and write accesses can be performed in a double-word, word and also byte manner, i.e., with a 32-bit, 16-bit or 8-bit data width. If, however, one of the components - central unit, bus or peripheral unit - has a lesser data bus width, this restricts the data width of the accesses. The conversion, for example, of a 32-bit access of the central unit 1 into suitable 8-bit or 16-bit accesses is handled by a bus interface which is integrated into the central unit 1. Thus, cost-effective plug-in modules having an 8-bit data bus connection can be used as peripheral units. Based on the control signals, the bus interface then handles all write and read accesses on the bus generally in the form of byte accesses.

The present invention is usable as such even in more complex automation equipment in which the central unit 1 is located in a central card rack and the peripheral unit 3 in an extended card rack. The bus 2 is then implemented by an interface module of the two card racks, and the connecting elements between the individual components correspond to the rear-panel wirings of the individual card racks.

Based on the table in FIG. 2, the coding of the individual control signals and the sequence of data transmission is explained hereafter. In the left column group separated by thick lines, the access request ZW, the address signals A1 and A0 and the control signals WS (WORD SELECT) and DWS (DOUBLE WORD SELECT) are listed. The right column group contains in each case for peripheral units PE having a 32-bit, 16-bit or 8-bit data width an indication of the used data lines DA, the state of the acknowledgement signals R8, R16 and R32 as well as the implemented access mode ZA. The rows of the table contain in each case the states of the signals for a specific access request ZW. The L indicator corresponds to a Low state on a signal line, and the H indicator to a High state. For the address signals A1 and A0, the Low state implies the output of the value "0"; for the control signals WS, DWS, R8, R16 and R32, it represents the active state.

A double word access by the central unit ZE to an even word address (A0=L, A1=L) corresponding to the first row of the table is indicated by the signal states WS=L and DWS=L. These signal states appear in the peripheral unit PE only if the signals on the entire signal path up to the peripheral unit PE do not "become lost" somewhere. This is the case only if all components have available a 32-bit data bus connection. A peripheral unit having a 32-bit data bus receives under this condition the signal states uncorrupted, acknowledges with a low state L of the acknowledgement signal R32 and transmits with the data signals D0 . . . D31 in the double word access mode DW. Transmission of the double word is thus completed. If, on the other hand, the double word access request DW of the central unit ZE is directed to a peripheral unit PE having a 16-bit data bus connection which peripheral unit PE has no connection for the control signal DWS, then it receives only the low state L of the control signal WS. For this peripheral unit PE, the double word access request DW is equivalent to a word access request W. Therefore, it acknowledges this access request with a low state L of the acknowledgement signal R16 and executes the access with the data signals D0 . . . D15 in the access mode W. The bus interface of the central unit ZE which bus interface detects the word access through the Low state of the acknowledgement signal R16 executes, in order to complete the double word access, a further word access at the next higher address which word access is characterized by the signal states in the seventh row of the table. In this process, the signal BL (BUS LOCK), not shown in the table, can be set to the active state in order to ensure successive transmission of the two data words. After transmission of the complete double word has occurred, the signal BL is reset to its previous state.

A peripheral unit PE having an 8-bit data connection receives neither the control signal WS nor the control signal DWS. It interprets a double word access request DW as a byte access B, acknowledges with a Low state of the control signal R8 and performs the transmission of the byte on the data lines D0 . . . D7. The bus interface in the central unit ZE recognizes through the acknowledgement signal R8 the byte access which occurred and performs thereupon for an active signal BL the remaining three byte accesses of the double word transmission at respective incremented addresses. The codings of the states for these three accesses can be taken from rows 10, 11 and 12 of the table. These byte accesses are identical to those of a central unit having an 8-bit data bus connection. From the viewpoint of the peripheral unit having an 8-bit data bus width, there is thus no noticeable difference between the different central units. Naturally, the central unit ZE having a 32-bit data bus connection can also output a word or byte access request for which the signal states in rows 5, 7 and 9 . . . 12 of the table are indicated. The access requests marked with a "*" are not provided in the exemplary embodiment. A "–" as the signal state of the acknowledgement signals R16 or R32 in the table means that no state is generated for this signal by the corresponding unit such that the central unit ZE always receives a High state for this signal which High state is guaranteed by wiring the signal line with a PULL-UP resistor.

If the signal paths to a peripheral unit having a 32-bit data bus connection are connected only with a 16-bit or 8-bit data bus width, it reacts to double word and word accesses like a peripheral unit having a 16-bit or 8-bit data bus connection. Likewise, a peripheral unit having a 16-bit data bus connection reacts to double word and word accesses like a peripheral unit having an 8-bit data bus connection for an 8-bit data bus width.

Double word access requests of a central unit having an 8-bit data bus connection are always implemented as four successive byte accesses via the data signals D0 . . . D7 with an activated control signal BL. Analogously, double word accesses of a central unit having a 16-bit data connection take place as two successive word accesses.

If a double word access has to be performed at an uneven word address (A0=H or A1=H), even central units having a 32-bit data bus connection break up this access into multiple successive bus operations with an activated control signal BL.

What is claimed is:

1. An arrangement for transmitting data over a bus said arrangement having a central unit which initiates data transmission and one or more peripheral units linked to each other by the bus, the units and the bus having first control lines for a first transmission request signal of the central unit and for a first transmission acknowledgement signal of a peripheral unit for parallel transmission of a data word of a first data width, at least one unit and/or the bus having second control lines for parallel transmission of a data word of a second data width, which carry a second transmission request signal in the peripheral unit and a second transmission acknowledgement signal in the central unit, such that the second transmission request signal in the peripheral unit and the second transmission acknowledgement signal in the central unit assume an active state only if all devices involved in the transmission have second control lines.

2. The arrangement according to claim 1, wherein the second data width is a multiple of the first data width.

3. The arrangement according to claim 2, wherein the units and the bus have a further control line to indicate bus usage which is activated during transmission of a data word of the second data width if not all devices involved in the transmission have second control lines such that the data word of the second data width is transmitted as a number of data words of the first data width, wherein the number of data words of the first data width corresponds to the multiple by which the second data width exceeds the first data width.

4. The arrangement of claim 1, further comprising additional control lines for parallel transmission of data words corresponding to at least one further data width.

5. The arrangement of claim 4, wherein the first data width is equal to 8 bits, the second data width is equal to 16 bits and a further data width is equal to 32 bits.

6. The arrangement of claim 1, wherein the units are plug-in modules and the bus comprises a rear-panel wiring of a card rack.

7. The arrangement of claim 1, wherein the arrangement is a part of automation equipment.

8. A central unit, peripheral unit or bus for use in an arrangement according to claim 1, wherein the arrangement has control lines for parallel transmission of a data word of the second data width.

* * * * *